United States Patent
Straub et al.

(10) Patent No.: US 6,364,959 B1
(45) Date of Patent: Apr. 2, 2002

(54) PROCESS FOR CLEANING A TRANSPORT BELT

(75) Inventors: Karlheinz Straub; Dieter Haberzettl; Birgit Bertram; Johann Eisler, all of Heidenheim; Lutz-Thomas Herrmann, Königsbronn, all of (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/310,747

(22) Filed: May 13, 1999

(30) Foreign Application Priority Data

May 16, 1998 (DE) .......................................... 198 22 185

(51) Int. Cl.$^7$ ................................................ B08B 1/02
(52) U.S. Cl. ................. 134/9; 134/15; 134/18; 134/32; 134/34; 134/42; 134/122 R; 198/493; 198/494; 198/495; 100/151; 162/275; 162/277; 162/278
(58) Field of Search .................. 134/9, 15, 18, 134/32, 34, 42, 122 R; 198/493, 494, 495; 100/151; 162/277, 275, 278

(56) References Cited

U.S. PATENT DOCUMENTS

| 3,739,605 | A | * | 6/1973 | Baker .............................. 68/20 |
| 3,910,815 | A | * | 10/1975 | Shelor ......................... 162/199 |
| 4,087,320 | A | * | 5/1978 | Danahy et al. .............. 162/252 |
| 4,167,440 | A | * | 9/1979 | Falk ............................ 162/277 |
| 4,378,639 | A | * | 4/1983 | Walker .......................... 34/12 |

(List continued on next page.)

FOREIGN PATENT DOCUMENTS

| DE | 9208909.7 | 11/1992 |
| DE | 29517859 | 2/1996 |
| DE | 19539015 | 10/1996 |
| DE | 19726897 | 1/1999 |
| EP | 0731212 | * 9/1996 |
| FR | 2604199 | 3/1999 |

OTHER PUBLICATIONS

Gall et al., "Tips für Papiermacher aus der Praxis des Siebherstellers," *Wochenblatt für Papierfabrikation*, 23/24 pp 1238–1242 (1998).

(List continued on next page.)

*Primary Examiner*—Sharidan Carrillo
(74) *Attorney, Agent, or Firm*—Greenblum & Bernstein, P.L.C.

(57) ABSTRACT

A process and apparatus for cleaning a transport belt of a machine for the production or processing a web. The apparatus includes at least one nozzle device composed of a rotatable nozzle head having at least one cleaning nozzle, a transport device including a crosspiece extending substantially crosswise to a transport belt travel direction, in which the at least one nozzle device is coupled to the transport device and adapted for displacement along the crosspiece. A traversing speed of the nozzle device is very low and falls within a range of between approximately 1 mm/min and 10 mm/min. Alternatively, the at least one nozzle is positionable in a plurality of cleaning positions that are successively arranged crosswise to the transport belt, and the at least one nozzle is held stationary in each respective cleaning position for a predefined time period. The process includes displacing the at least one cleaning nozzle at a very slow traversing speed within a range of between approximately 1 mm/min and 10 mm/min. Alternatively, the process includes discontinuously moving the at least one cleaning nozzle to a plurality of cleaning positions successively arranged in a transport belt travel direction, positioning the at least one nozzle to remain in the cleaning positions for a predefined period of time, and rapidly displacing the at least one nozzle between adjacent cleaning positions.

15 Claims, 2 Drawing Sheets

U.S. PATENT DOCUMENTS

| | | | | |
|---|---|---|---|---|
| 4,540,469 A | * | 9/1985 | Lundstrom | 162/277 |
| 4,605,472 A | * | 8/1986 | Nakamura | 162/277 |
| 4,701,242 A | * | 10/1987 | Scareno et al. | 162/277 |
| 4,753,712 A | * | 6/1988 | Martin et al. | 162/277 |
| 5,282,575 A | * | 2/1994 | Krulick et al. | 239/255 |
| 5,595,632 A | * | 1/1997 | Macierewicz | 162/277 |
| 5,783,044 A | * | 7/1998 | Schneider et al. | 162/275 |
| 5,879,515 A | * | 3/1999 | Straub et al. | 162/275 |
| 5,964,956 A | * | 10/1999 | Straub et al. | 134/15 |
| 5,964,960 A | * | 10/1999 | Boeck | 134/34 |
| 6,050,392 A | * | 4/2000 | Straub | 198/495 |
| 6,051,076 A | * | 4/2000 | Oechsle et al. | 134/15 |
| 6,053,986 A | * | 4/2000 | Oechsle et al. | 134/15 |
| 6,143,092 A | * | 11/2000 | Straub et al. | 134/15 |

OTHER PUBLICATIONS

Penn, "Konditionierung der Naßpertiebespannung mit Spezial–Spritzrohren," *Wochenblatt für Papierfabrikation*, 10, pp. 427–429 (1987).

Charbonneau, "Moisture Profile Management," *TAPPI Journal*, vol. 80, No. 11, pp. 79–82 (1997).

"Clean Tech—Rechnergestütztes Reinigungssystem für die Sieb–und Pressenpartie," *Wochenblatt für Papierfabrikation*, 18, p. 820 (1996).

Bott, "Über den Einsatz Oszilleirender Hochdruckspritzrohre zur Konditionierung von Filzen in Papier–und Kartonmaschine," *Wochenblatt für Papierfabrikation*, 10, pp. 346–350 (1976).

\* cited by examiner

PROCESS FOR CLEANING A TRANSPORT BELT

CROSS-REFERENCE TO RELATED APPLICATIONS

The present application claims priority under 35 U.S.C. §119 of German Patent Application No. 198 22 185.1, filed on May 16, 1998, the disclosure of which is expressly incorporated by reference herein in its entirety.

BACKGROUND OF THE INVENTION

1. Field of the Invention

The present invention concerns a device for the cleaning of a transport (conveyor) belt, e.g., a dry or wet wire belt or a felt belt, of a machine for the production or processing of a web, e.g., a paper or cardboard web. The device includes at least one nozzle device having at least one cleaning nozzle to deliver a cleaning jet aimed at the transport belt. In this manner, the cleaning nozzle is rotatably installed on a nozzle head of the nozzle device to be rotated around an axis, and the nozzle device is arranged on a transport device that is displaceable along a crosspiece extending crosswise or substantially crosswise to a transport belt travel direction.

The present invention is related to a process for the cleaning of a transport belt, e.g., a dry or wet wire belt or a felt belt, of a machine for the production or processing of a web, e.g., a paper or cardboard web. The process includes rotating at least one cleaning nozzle around an axis, aiming a cleaning jet from the at least one cleaning nozzle toward the transport belt, and displacing the at least one cleaning nozzle crosswise to a transport belt travel direction.

2. Discussion of Background Information

Cleaning devices and processes of the type generally discussed above have been disclosed, e.g., in German Patent No. DE 195 39 015 C2, the disclosure of which is expressly incorporated by reference herein in its entirety. The disclosed device and process are utilized in connection with a material web production or processing machine to clean a transport (conveyor) belt which has become soiled during operation of the machine. In the process, the meshes and pores of the porous transport belt become clogged with paper fibers, adhesives, or other additions. To ensure problem-free operation of the transport belt, cleaning of the transport belt is necessary, e.g., with a cleaning device that includes at least one nozzle device, which has the at least one cleaning nozzle installed on a nozzle head that rotates around an axis. Using the cleaning nozzle, a cleaning jet, e.g., a liquid stream, can be aimed at the transport belt. To improve the cleaning effect of the rotating cleaning nozzle, the nozzle device is disposed on a transport device, which is displaceable along a crosspiece running crosswise to the transport belt travel direction. The traversing speed in the known cleaning device falls within a range from approximately 0.1 m/min to approximately 0.5 m/min. Due to the fact that a linear traversing motion is superimposed on the rotary motion of the cleaning nozzle, a relatively broad band-shaped region of the transport belt is cleaned instead of a line.

It has been demonstrated that, due to the rotation of the cleaning nozzle, the cleaning effect is amplified in the sections of the circle which lie roughly in the direction of travel of the transport belt. This irregular cleaning of the transport belt cannot be equalized despite the traversing motion of the cleaning nozzle. Thus, the moisture profile of the transport belt, which affects the properties of the paper or cardboard web and should be as low and as uniform as possible, cannot be adjusted as desired. This results due to the fact that, in the regions in which an amplified cleaning effect occurs, the transport belt is more highly soaked than in the regions of the transport belt in which the cleaning nozzle cleans with reduced cleaning effect. To date, the known cleaning devices are operated with a compromise between adequate cleaning effect and a simultaneously relatively low moisture profile of the transport belt. However, it has been shown that it is not possible in all cases to realize a low and particularly uniform moisture profile of the transport belt, and a good cleaning effect of the cleaning device.

SUMMARY OF THE INVENTION

Therefore, the present invention improves the cleaning device as generally discussed above and the process implemented with the cleaning device that does not suffer from the above-noted disadvantages.

The cleaning device according to the present invention includes a nozzle device that is displaceable, on a crosspiece during the cleaning process, into a plurality of cleaning positions lying one after the other (successively arranged) in the transport belt travel direction, in which the nozzle device is held stationary for a predefined, and in particular, variable period of time in each respective cleaning position. Further, a change between cleaning positions occurs suddenly. In connection with the present invention, the term "suddenly" is understood to mean, e.g., a rapid displacement at a relatively high speed. Thus, displacement of the nozzle device on the crosspiece from one cleaning position to the next occurs very quickly, such that, in each region of the surface of the transport belt, a predefined, and preferably substantially equally long, duration of action can be realized. The period of time in which the cleaning nozzle or the nozzle device is disposed in a cleaning position can be varied, e.g., as a function of the degree of soiling, of the machine speed, of the moisture profile of the transport belt, and/or the rotational speed of the nozzle head. Through the discontinuous displacement of the nozzle device from one cleaning position to the next, a good cleaning effect can be realized with a simultaneously low moisture profile.

In an exemplary embodiment of the cleaning device, a distance between two adjacent cleaning positions may correspond to the cleaning width, e.g., at least substantially to the cleaning width of the cleaning nozzle rotating around an axis. Thus, in each cleaning position, a band-shaped section of the transport belt is cleaned, and adjacent sections abut each other.

Further, a traversing speed of the nozzle device can be very low and falls within a range between approximately 1 mm/min and 10 mm/min, and preferably between approximately 2 mm/min and 5 mm/min. Thus, it is possible to ensure that the duration of action of the cleaning jet coming from the cleaning nozzle, e.g., air, steam, or a liquid stream, reaches a minimum value at each location or region of the transport belt. In other words, due to the very slow displacement of the nozzle device over the entire width of the transport belt, it is possible to obtain a desired, and preferably uniform and intense, cleaning action such that it is advantageously possible to realize at the same time a uniform moisture profile of the transport belt. The duration of action of the cleaning jet on the transport belt is set, e.g., as a function of the degree of soiling of the transport belt and the type of paper or cardboard web, which is determined, e.g., by its ash content and pulp density. The traversing speed may preferably be set as a function of the machine speed, i.e., the speed of travel of the material web.

In the process for the cleaning of a transport belt of a machine for the production or processing of a paper or cardboard web, at least one cleaning nozzle, which is displaceable crosswise to the transport belt travel direction and rotatable around an axis, is used. A cleaning jet, e.g., a steam or liquid jet, ejected from the at least one cleaning nozzle, can be aimed at the transport belt. The process further includes displacing the cleaning nozzle very slowly and, preferably, with a constant traversing speed over the width of the transport belt. The traversing speed may fall within a range between approximately 1 mm/min and 10 mm/min, and preferably between approximately 2 mm/min to 5 mm/min.

During the cleaning process, the cleaning nozzle may assume a plurality of (discrete) cleaning positions lying one after another crosswise to the transport belt travel direction, and may stay in each of the cleaning positions for a predefined period of time. Further, the cleaning nozzle may be rapidly repositioned between adjacent cleaning positions so as to ensure a uniform cleaning action of the cleaning nozzle over the entire width of the transport belt. As a result, a relatively low and uniform moisture profile of the transport belt may be set.

The present invention is directed to a process for cleaning a transport belt of a machine for the production or processing of a web. The machine has an apparatus that includes at least one nozzle device composed of a rotatable nozzle head having at least one cleaning nozzle adapted to deliver a cleaning jet aimed toward the transport belt, a transport device that includes a crosspiece extending substantially crosswise to a transport belt travel direction. The at least one nozzle device is coupled to the transport device, and the at least one nozzle device is coupled and adapted for displacement along the crosspiece. The process includes displacing the at least one cleaning nozzle along the crosspiece at a very slow traversing speed within a range of between approximately 1 mm/min and 10 mm/min. Further, the very slow traversing speed may be within a range of between approximately 2 mm/min to 5 mm/min, and the very slow traversing speed may be a substantially constant traversing speed. Further still, the transport belt may be composed of one of a dry or wet wire belt or a felt belt, and the machine may produce or process a web composed of one of a paper and a cardboard web.

The present invention is also directed to a process for cleaning a transport belt of a machine for the production or processing of a web. The process includes discontinuously moving the at least one cleaning nozzle along the crosspiece to a plurality of cleaning positions successively arranged in a transport belt travel direction, positioning the at least one nozzle to remain in the cleaning positions for a predefined period of time, and rapidly displacing the at least one nozzle between adjacent cleaning positions.

In accordance with another feature of the present invention, after being positioned over a cleaning position located at a lateral edge of the transport belt, the process further includes rapidly repositioning the at least one cleaning nozzle to the other lateral edge of the transport belt.

According to another feature of the present invention, the cleaning process may be initiated at a lateral edge of the transport belt.

According to still another feature of the present invention, a maximum distance between adjacent cleaning positions may correspond to the cleaning width of the rotating cleaning nozzle.

In accordance with a further feature of the present invention, a distance between adjacent cleaning positions may be within a range of between approximately 2 mm to 100 mm, and preferably within a range of between approximately 10 mm and 50 mm.

In accordance with a still further feature of the present invention, a period of time in which the cleaning nozzle remains in a respective cleaning position is within a range of between approximately 0.1 min and 10 min, and preferably the period of time may be between approximately 1 min to 5 min.

The present invention is directed to an apparatus for cleaning a transport belt of a machine for the production or processing of a web. The apparatus includes at least one nozzle device composed of a rotatable nozzle head having at least one cleaning nozzle adapted to deliver a cleaning jet aimed toward the transport belt, a transport device including a crosspiece extending substantially crosswise to a transport belt travel direction, in which the at least one nozzle device is coupled to the transport device and is adapted for displacement along the crosspiece. The at least one nozzle is positionable in a plurality of cleaning positions that are successively arranged crosswise to the transport belt, and the at least one nozzle is held stationary in each respective cleaning position for a predefined time period.

In accordance with another feature of the present invention, the at least one nozzle may be moved between adjacent cleaning positions such that a transition time between adjacent cleaning positions is less than the predefined time period.

In accordance with still another feature of the present invention, a distance between two adjacent cleaning positions may substantially correspond to a cleaning width of the at least one nozzle.

According to still another feature of the present invention, upon reaching a lateral edge of the transport belt, the cleaning nozzle may be rapidly displaceable to the other lateral edge of the transport belt.

The present invention is also directed to an apparatus for cleaning a transport belt of a machine for the production or processing of a web. The apparatus includes at least one nozzle device composed of a rotatable nozzle head having at least one cleaning nozzle adapted to deliver a cleaning jet aimed toward the transport belt, a transport device including a crosspiece extending substantially crosswise to a transport belt travel direction, in which the at least one nozzle device is coupled to the transport device and is adapted for displacement along the crosspiece. The traversing speed of the nozzle device is very low and falls within a range of between approximately 1 mm/min and 10 mm/min, and preferably between approximately 2 mm/min and 5 mm/min.

According to yet another feature of the present invention, the nozzle device is adapted for substantially constant traversing speed during displacement from one lateral edge of the transport belt to the other lateral edge.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The cleaning device in accordance with the features of the present invention can be utilized in general for the cleaning of a transport (conveyor) belt of a machine for the production or processing of a web, e.g., a paper or cardboard web. The cleaning device may be utilized for any of the transport belts of the machine, e.g., wire belts or felts of a wire, and/or may be utilized in any of the sections of the machine, e.g., the pressing section and the drying section. For purposes of illustration, the description of the present invention is described in terms of drying wires (drying wire belts) of a paper machine, however, this description is not to be construed as limiting. The features of the present invention can be practiced in other web producing machines and various sections thereof in accordance with the features of the present invention.

Figure 1:
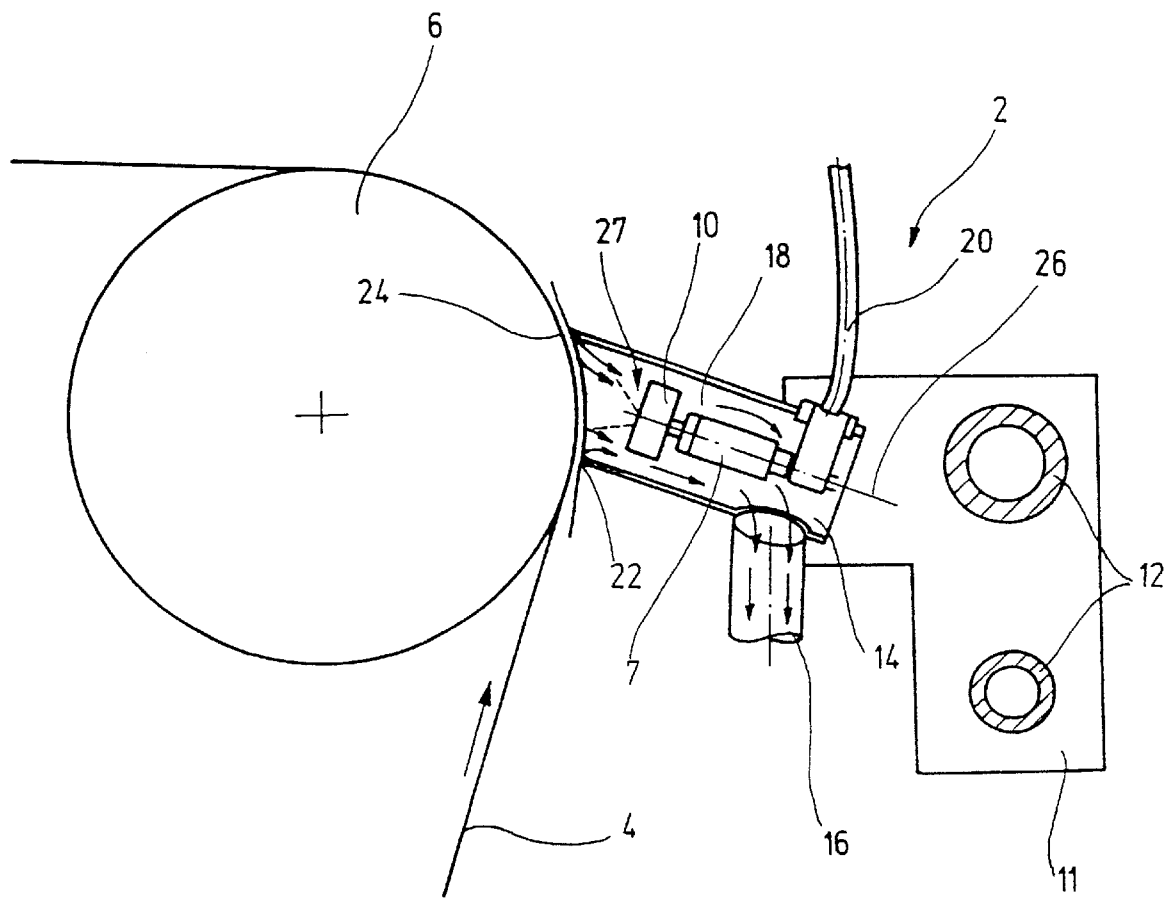
FIG. 1 illustrates a partial side view of an exemplary embodiment of the cleaning device according to the present invention.

FIG. 1 schematically illustrates a side view of an exemplary embodiment of a cleaning device 2, which is positioned for cleaning a drying wire or transport (conveyor) belt 4 in a region of roll 6 of a web producing machine (not shown). Because the structure of cleaning device 2 is known, only a brief discussion of this device will be provided herein. Cleaning device 2 includes a nozzle device 7, which has a rotating nozzle head 10. The specific nozzle arrangement is not shown, but the nozzle arrangement may include one or a plurality of tangentially flowing booster nozzles positioned to generate a rotational motion in a range between, e.g., approximately 200 rpm to 3000 rpm. Moreover, one or a plurality of cleaning nozzles may be positioned to act on transport belt 4 with a cleaning medium, e.g., air, steam, or liquid. It is noted that, in the alternative, rotational motion of nozzle head 10 may be generated in another manner, e.g., with a motor. For the purposes of explanation, the exemplary embodiment will be described with reference to a liquid cleaning, however, this exemplary description should not be construed as limiting the present invention to any specific state for the cleaning medium.

Moreover, a cylindrical suction jar (bell) 14 may be provided to surround nozzle device 7 and nozzle head 10. The interior of suction jar 14 may be coupled to a discharge line 16 to form a suction chamber 18 associated with nozzle device 7.

To supply the medium, cleaning device 2 has an energy chain, of which only a high-pressure hose 20 is shown, which may be coupled to a high-pressure pump to supply nozzle device 7 with liquid in a pressure range, e.g., between approximately 100 bar to 1000 bar. Further, cleaning device 2 may be coupled to discharge line 16 for removal of spray water or mist with dirt particles therein from suction chamber 18.

The previously described components of the cleaning device 2 may be arranged on a transport device which is formed, e.g., with a traversing cart 11 that is displaceable in a direction crosswise to a direction of travel of transport belt 4. Traversing cart 11 can travel along a crosspiece which includes, e.g., two crossbeams 12. Traversing cart 11 may be seated on crossbeams 12, and can be driven by a traversing motor (not shown) at a presettable speed, which is discussed in greater detail with reference to FIG. 2.

As shown in FIG. 1, an end region 22 of suction jar 14 is positioned to face transport belt 4, and is adapted to the circular cylindrical circumferential shape of roll 6. In this manner, a specific adjustable distance or gap between suction jar 14 and transport belt 4 may be provided which is substantially constant along edge 24 of end region 22.

The positioning of cleaning device 2 along roll 6 has the advantage that the meshes of transport belt 4 are expanded by deflection of transport belt 4 over roll 6. In this manner, the cleaning medium can penetrate particularly uniformly into the fabric structure of transport belt 4, thus, very effectively removing contaminants.

During operation of cleaning device 2, the nozzle arrangement in nozzle head 10 of nozzle device 7 is acted upon with a cleaning medium through high-pressure hose 20, e.g., preferably water supplied under high pressure. Nozzle head 10 with the arrangement of individual cleaning nozzles, not shown in FIG. 1, is set in rotation in the exemplary embodiment by the recoil effect of booster nozzles. As a result, a cleaning jet, such as a liquid stream, describes, e.g., a cone-shaped path 27 running at a specific angle relative to a longitudinal axis 26 of nozzle device 7. Longitudinal axis 26 coincides here with the axis of rotation of nozzle head 10. In the exemplary embodiment, the cleaning jet(s) strike(s) transport belt 4 at an angle, thereby freeing the contaminants from the belt surface.

It may also be possible to equip nozzle head 10 with one or a plurality of pivotably mounted, oscillating cleaning nozzles which sweep a band-shaped region of transport belt 4 during the traversing motion of nozzle device 7.

By superposing the traversing motion and the rotational or swivelling motion, the dirt particles are struck at different directions by the liquid stream of the nozzle arrangement and, thereby, can be released simply. By inclining nozzle head 10 or the nozzle arrangement, it may be further accomplished that the cleaning jet/liquid stream striking transport belt 4 is reflected into vacuum chamber 18, such that the mist created can be discharged via suction line 16 along with dirt particles bound in the mist and residual water. A suction effect or current depicted by the arrows results. Consequently, no spray water appears around suction jar 14, and, therefore, leakage of dirt or water can be virtually avoided.

Figure 2:
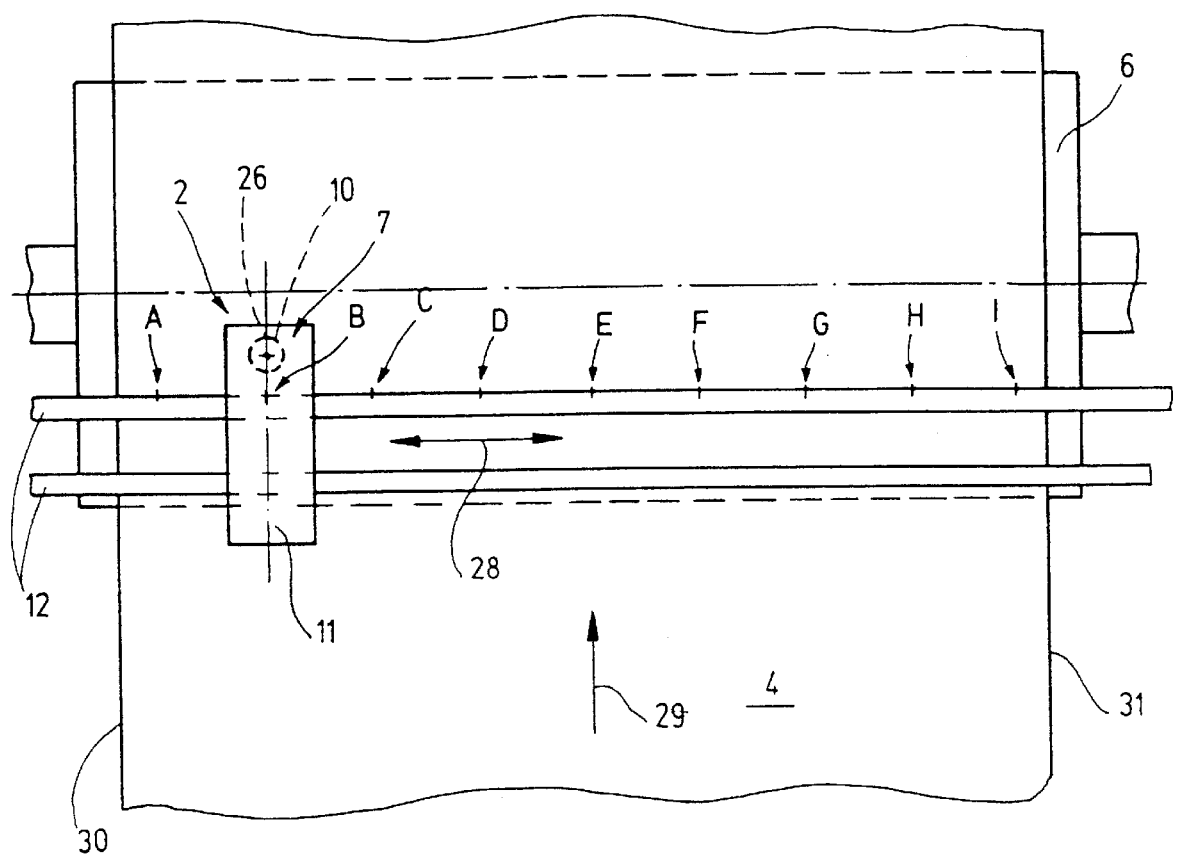
FIG. 2 illustrates a cross-section through a portion of a web production or processing machine in the region of the cleaning device.

FIG. 2 schematically illustrates a cross-section through a portion of the paper machine in the region of roll 6. Parts which correspond to those described with regard to FIG. 1 are provided with the same reference characters, so that reference can be made to the description of FIG. 1. In FIG. 2, only the nozzle head 10 is indicated with dashed lines. The displacement direction of traversing cart 11 is depicted with a double arrow 28, and the direction of travel of transport belt 4 is depicted with an arrow 29. It is clear from FIG. 2 that the direction of displacement of traversing cart 11 here runs practically perpendicular to the direction of travel of transport belt 4. In another exemplary embodiment (not shown), traversing cart 11 may be displaced obliquely relative to the direction of travel and over its entire width. What is important is that, during a cleaning process, the cleaning medium applied to transport belt 4 via nozzle device 7 reaches each region of transport belt 4 through the traversing motion.

To ensure uniform cleaning of transport belt 4 over the entire width, as well as a relatively low and uniform moisture profile of transport belt 4, provision is made according to a first alternative embodiment that the traversing speed of nozzle device 7 or of traversing cart 11 falls within a range of, e.g., between approximately 1 mm/min and 10 mm/min, and preferably between approximately 2 nm/min and 5 mm/min.

The cleaning process begins preferably at one of the two lateral edges 30 and 31 of transport belt 4. Moreover, provision is made that during displacement of nozzle device 7 from one lateral edge of transport belt 4 to the other, the speed of traversing cart 11 is constant.

After nozzle device 7 has cleaned transport belt 4 over the entire width and as long as the cleaning of transport belt 4 has not yet been completed, traversing cart 11 can be repositioned on the other lateral edge of transport belt 4 at either the same, a lower, or a higher speed, while nozzle device 7 continues to spray the cleaning medium on transport belt 4.

In order to ensure that each point or surface region of transport belt 4 is cleaned at equal time intervals, an alternative embodiment provides that traversing cart 11 with nozzle device 7 installed thereon is suddenly driven back, after reaching one of the lateral edges 30 or 31 of transport belt 4, to the other lateral edge of transport belt 4 to begin again immediately, or with a time delay, repeated cleaning of transport belt 4. During the return travel of traversing cart 11, nozzle device 7 is preferably inactive, i.e., no cleaning medium is applied to transport belt 4. Alternatively, it may be possible that nozzle device 7 be driven back slowly and, at that time, for example, a gas stream drying transport belt 4 may be applied thereon. For this, it is possible to use, e.g., the cleaning nozzle of nozzle device 7, which is decoupled through a switching device from the supply of cleaning medium and connected, e.g., to a compressed air supply.

In the above-described alternative embodiments, the cleaning process begins on one of the two lateral edges 30 or 31 of transport belt 4. It is also possible to start the cleaning process in the central region of transport belt 4, i.e., lying between the two lateral edges 30 and 31. In this embodiment variant, when nozzle device 7 reaches one of the lateral edges 30 or 31 of transport belt 4, nozzle device 7 may be repositioned very quickly to the other lateral edge of transport belt 4, then be moved in a direction toward the first lateral edge.

Preferably common to the embodiment variants of the process for cleaning transport belt 4 with cleaning device 2 is that the starting position, at which nozzle device 7 begins the cleaning of transport belt 4, is also the ending position, on which the cleaning of transport belt 4 terminates.

In another alternative embodiment of the process according to the present invention, nozzle device 7 may be moved during the cleaning process into a plurality of cleaning positions on the crosspiece (crossbeams) 12 and held stationary in the respective cleaning position for a predefined period of time. The change from one cleaning position to the next takes place suddenly (rapidly). FIG. 2 depicts, purely by way of illustration, imaginary cleaning positions A through I, which are positioned in this exemplary embodiment substantially equidistant from each other, i.e., the distance between cleaning positions A and B, F and G, or F and E is, e.g., a substantially same distance.

In the operating position of cleaning device 2 depicted in FIG. 2, nozzle device 7 may be positioned in cleaning position B. During a cleaning procedure in which transport belt 4 is preferably cleaned over its entire width, and cleaned over at least substantially over the entire width, nozzle device 7 may be positioned sequentially at each of the discrete and successive cleaning positions A through I. If the cleaning procedure begins, e.g., at cleaning position A, cleaning nozzle 7 may be moved next to cleaning position B, then to cleaning position C, etc. Moreover, cleaning nozzle 7 may be positioned to remain in each of these positions for a same duration of time. If the cleaning process begins on the other side of transport belt 4, i.e., in the region of lateral edge 31, nozzle device 7 may be moved first into cleaning position I, then into cleaning position H, etc. From all this, it is clear that nozzle device 7 is discontinuously moved during the cleaning procedure.

In this exemplary embodiment of the process according to the present invention, nozzle device 7 may be repositioned after reaching one of the ending or starting positions A and I to the first cleaning position on the other lateral edge of transport belt 4 so that each point or surface area of transport belt 4 is cleaned at equal time intervals. The cleaning procedure can, e.g., also begin outside cleaning positions A and I in one of the other cleaning positions, e.g., H or E, such that nozzle device 7 cleans transport belt 4, i.e., starting from a region of transport belt 4 lying between lateral edges 30 and 31, in the direction of one of the lateral edges. Also, in this exemplary embodiment, nozzle device 7 may be moved upon reaching one of the lateral edges of transport belt 4 preferably suddenly to the other lateral edge and the cleaning procedure is continued there.

From the foregoing, it is clear that, notwithstanding at what specific starting position on transport belt 4 the cleaning begins or ends, uniform cleaning of transport belt 4 and the setting of a uniform and low moisture profile of transport belt 4 results. What is important is that, during cleaning, nozzle device 7 is either very slowly moved crosswise over the width of transport belt 4 or spends an equally long period of time in a plurality of cleaning positions.

In a preferred exemplary embodiment, provision is made that the distance between two adjacent cleaning positions, e.g., between cleaning positions A and B or D and E correspond to the cleaning width of the cleaning nozzle (not shown)—rotating around longitudinal axis 26. The cleaning width of the rotating cleaning nozzle falls within a range of between, e.g., approximately 2 mm and 100 mm, and preferably approximately 10 mm and 50 mm.

The period of time in which nozzle device 7 is located in one of cleaning positions A through I falls within a range between, e.g., approximately 6 sec and 10 min, and preferably approximately 1 min to 5 min. Of course, it is also possible that the period of time could be less than 6 sec or could be more than 10 min. This time period can be adjusted, e.g., as a function of the pressure of the cleaning medium, the diameter of the cleaning nozzle, the machine speed, and/or the degree of soiling of transport belt 4.

From the foregoing, it should be apparent that the specific number of cleaning positions into which nozzle device 7 can be moved may be more than nine or possibly even fewer than nine. The specific number depends, e.g., on the width of transport belt 4 and/or the cleaning width of cleaning nozzle 7.

In an additional exemplary embodiment, not depicted in the Figures, a plurality of cleaning devices 2 are disposed on the crosspiece formed by crossbeams 12 and are displaceable thereon, such that large areas of transport belt 4 can be cleaned simultaneously. The larger the number of cleaning devices, the greater the share of the area of transport belt 4 with the same degree of cleanness and preferably also the same low moisture profile.

In summary, it should be noted that, with the above-described process, variants for the cleaning of a transport belt of a machine for the production or processing of a paper or cardboard web, it is possible to realize uniform cleaning and a relatively low and uniform moisture profile of the transport belt. Through the cleaning of the transport belt according to the invention, its problem-free operation can be ensured.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for cleaning a transport belt of a machine for the production or processing of a web, the machine having an apparatus that includes at least one nozzle device composed of a rotatable nozzle head having at least one cleaning nozzle structured and arranged to deliver a cleaning jet aimed toward the transport belt, a transport device that includes a crosspiece extending substantially crosswise to a transport belt travel direction, the at least one nozzle device being coupled to the transport device and being structured and arranged for displacement along the crosspiece, the process comprising:

delivering the cleaning jet to the transport belt from the at least one nozzle, and displacing the at least one cleaning nozzle along the crosspiece at a traversing speed within a range of between approximately 1 mm/min and 10 mm/min.

2. The process according to claim 1, wherein the traversing speed is within a range of between approximately 2 mm/min to 5 mm/min.

3. The process according to claim 1, wherein the traversing speed is a substantially constant traversing speed.

4. The process according to claim 1, wherein the transport belt is composed of one of a dry or wet wire belt or a felt belt.

5. The process according to claim 1, wherein the machine produces or processes a web composed of one of a paper and a cardboard web.

6. A process for cleaning a transport belt of a machine for the production or processing of a web, the machine having an apparatus that includes at least one nozzle device composed of a rotatable nozzle head having at least one cleaning nozzle structured and arranged to deliver a cleaning jet aimed toward the transport belt, a transport device that includes a crosspiece extending substantially crosswise to a transport belt travel direction, the at least one nozzle device being coupled to the transport device and being structured and arranged for displacement along the crosspiece, the process comprising:

delivering the cleaning jet to the transport belt from the at least one nozzle;

discontinuously moving the at least one cleaning nozzle along the crosspiece to a plurality of cleaning positions successively arranged in a transport belt travel direction;

positioning the at least one nozzle to remain in the cleaning positions for a predefined period of time; and rapidly displacing the at least one nozzle between adjacent cleaning positions.

7. The process according to claims 6, wherein the transport belt includes two lateral edges, and, after being positioned over a cleaning position located at one of the lateral edges of the transport belt, the process further comprising:

rapidly repositioning the at least one cleaning nozzle to the other lateral edge of the transport belt.

8. The process according to claim 6, wherein the transport belt includes two lateral edges, and wherein the cleaning process is initiated at one of the lateral edges of the transport belt.

9. The process according to claim 6, wherein a maximum distance between said adjacent cleaning positions corresponds to a cleaning width of the rotating cleaning nozzle.

10. The process according to claim 6, wherein a distance between said adjacent cleaning positions is within a range of between approximately 2 mm to 100 mm.

11. The process according to claim 6, wherein a period of time in which the cleaning nozzle remains in a respective cleaning position is within a range of between approximately 0.1 min and 10 min.

12. The process according to claim 6, wherein the transport belt is composed of one of a dry or wet wire belt or a felt belt.

13. The process according to claim 6, wherein the machine produces or processes one of a paper and a cardboard web.

14. The process according to claim 10, wherein a distance between said adjacent cleaning positions is within a range of between approximately 10 mm and 50 mm.

15. The process according to claim 11, wherein the period of time is between approximately 1 min to 5 min.

* * * * *